United States Patent Office.

DAVID RINKLE, OF INDIANAPOLIS, INDIANA, ASSIGNOR TO HIMSELF AND CHARLES C. HUNT.

Letters Patent No. 101,042, dated March 22, 1870.

IMPROVED STOMACH BITTERS.

The Schedule referred to in these Letters Patent and making part of the same

I, DAVID RINKLE, of Indianapolis, in the county of Marion and State of Indiana, have invented a certain compound called Stomach Bitters, of which the following is a specification.

My invention consists in mixing green hickory-nuts or white walnuts, (commonly called butternuts,) broken nutmegs, cloves, cinnamon, and sugar with whisky, to form a healthful and agreeable beverage or tonic.

The proportion of ingredients composing the compound is as follows: Green hickory-nuts or white walnuts, ten parts; nutmegs, broken, one part; cloves, one and one-half part; cinnamon, two parts; sugar, from one to one and one-half part; whisky, or other suitable alcoholic liquor, twenty-five gallons.

To prepare the compound, the hickory-nuts or walnuts are gathered in June, or while the kernel is in a milky state. They are then soaked and washed enough to extract the green matter from them, and then sliced, and together with the other ingredients are put into whisky, the latter being contained in a suitable vessel to be heated. The compound is then macerated by a gentle heat at a temperature not exceeding 80° Fahrenheit, for a period of thirty days, or such time as is requisite to extract the virtue of the ingredients.

The nuts render the compound somewhat laxative, while the cloves, cinnamon, nutmeg, and sugar flavor and render it palatable and tonic.

What I claim, and desire to secure by Letters Patent, is—

The manufacture or preparation of a compound, which I denominate stomach bitters, of the ingredients, in the proportions, and for the purpose set forth.

In testimony that I claim the foregoing, I have hereunto set my hand this 7th day of February, 1870.

DAVID RINKLE.

Witnesses:
CHARLES COULOM,
I. KLINGENSMITH.